US009898012B2

(12) United States Patent
Peterson et al.

(10) Patent No.: US 9,898,012 B2
(45) Date of Patent: Feb. 20, 2018

(54) AIR ASSISTANCE AND DRIFT REDUCTION TECHNOLOGY FOR CONTROLLED DROPLET APPLICATOR

(71) Applicants: AGCO Corporation, Hesston, KS (US); John Peterson, Jackson, MN (US); Justin Bak, Windom, MN (US); Jeffrey Zimmerman, Jackson, MN (US)

(72) Inventors: John Peterson, Jackson, MN (US); Justin Bak, Windom, MN (US); Jeffrey Zimmerman, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 262 days.

(21) Appl. No.: 14/432,304

(22) PCT Filed: Sep. 25, 2013

(86) PCT No.: PCT/US2013/061524

§ 371 (c)(1),
(2) Date: Mar. 30, 2015

(87) PCT Pub. No.: WO2014/052351

PCT Pub. Date: Apr. 3, 2014

(65) Prior Publication Data

US 2015/0227143 A1 Aug. 13, 2015

Related U.S. Application Data

(60) Provisional application No. 61/707,338, filed on Sep. 28, 2012.

(51) Int. Cl.
*A01M 7/00* (2006.01)
*G05D 7/06* (2006.01)
(Continued)

(52) U.S. Cl.
CPC ........... *G05D 7/0635* (2013.01); *A01M 7/005* (2013.01); *A01M 7/0064* (2013.01); *B05B 3/085* (2013.01); *B05B 3/1014* (2013.01); *B05B 3/1021* (2013.01); *B05B 3/1064* (2013.01); *B05B 15/04* (2013.01); *G05B 15/02* (2013.01); *B05B 15/0437* (2013.01)

(58) Field of Classification Search
CPC .. A01M 7/005; A01M 7/0064; G05D 7/0635; B05B 3/1014; B05B 3/1021; B05B 3/1064; B05B 3/085; B05B 15/04; B05B 15/0437; G05B 15/02
USPC .......... 239/481, 462, 463, 288, 288.3, 288.5
See application file for complete search history.

(56) References Cited

U.S. PATENT DOCUMENTS 2,384,702 A 9/1945 Sells et al.
2,893,893 A 7/1959 Crouse
(Continued)

OTHER PUBLICATIONS

US Receiving Office, International Search Report for International Patent Application No. PCT/US2013/061524, dated Feb. 21, 2014.

*Primary Examiner* — Arthur O Hall
*Assistant Examiner* — Juan C Barrera

(57) ABSTRACT

A controlled droplet applicator (CDA) system comprising a CDA nozzle cup having an open end; a shroud covering all but a portion of the open end; and an air assist device disposed proximal to the open end, the cup and the air assist device separated by at least a portion of the shroud.

11 Claims, 9 Drawing Sheets

(51) Int. Cl.

| | |
|---|---|
| ***B05B 3/08*** | (2006.01) |
| ***B05B 3/10*** | (2006.01) |
| ***G05B 15/02*** | (2006.01) |
| *B05B 15/04* | (2006.01) |

(56) References Cited

U.S. PATENT DOCUMENTS

| | | | | |
|---|---|---|---|---|
| 3,749,313 | A | 7/1973 | Weitmann | |
| 4,006,858 | A | 2/1977 | Farmery | |
| 4,225,084 | A | 9/1980 | Bals | |
| 4,473,188 | A * | 9/1984 | Ballu | A01M 7/0028<br>239/121 |
| 4,540,124 | A | 9/1985 | Haruch | |
| 4,584,000 | A * | 4/1986 | Guest | B01D 53/501<br>159/4.2 |
| 4,609,145 | A * | 9/1986 | Miller | A01M 7/0014<br>239/159 |
| 4,619,401 | A * | 10/1986 | Hardman | B64D 1/18<br>239/214.17 |
| 4,728,035 | A | 3/1988 | Cruse et al. | |
| 4,795,095 | A * | 1/1989 | Shepard | B05B 3/105<br>239/214.17 |
| 5,795,391 | A * | 8/1998 | Niemann | B05B 3/10<br>118/315 |
| 6,547,883 | B2 * | 4/2003 | Molnar | B05B 3/1021<br>118/315 |
| 2005/0098653 | A1 | 5/2005 | Goldin | |
| 2010/0183476 | A1 | 7/2010 | Lu | |

* cited by examiner

```
                    ┌─────────┐
                    │  START  │
                    └────┬────┘
                         ▼
  ┌──────────────────────────────────────────────┐
  │ CAUSE A CDA NOZZLE CUP TO ROTATE, THE CDA    │
  │ NOZZLE CUP SURROUNDED AT LEAST IN PART BY    │
  │ A SHROUD HAVING AN APERTURE                  │
  └──────────────────────┬───────────────────────┘
                         ▼
  ┌──────────────────────────────────────────────┐
  │ RESPONSIVE TO THE ROTATION, DISPERSE         │
  │ DROPLETS FROM THE EDGE OF THE CUP TO A       │
  │ TARGET, THE DROPLETS DISPERSED THROUGH       │
  │ THE APERTURE                                 │
  └──────────────────────┬───────────────────────┘
                         ▼
  ┌──────────────────────────────────────────────┐
  │ ACTIVATE AN AIR ASSIST DEVICE DISPOSED       │
  │ PROXIMALLY TO THE EDGE OF THE CUP            │
  └──────────────────────┬───────────────────────┘
                         ▼
  ┌──────────────────────────────────────────────┐
  │ RESPONSIVE TO THE ACTIVATION, PROVIDE FROM   │
  │ THE AIR ASSIST DEVICE A DIRECTED AIR FLOW    │
  │ THAT IMPACTS THE TARGET, WHEREIN THE AIR     │
  │ FLOW DRAWS AT LEAST A PORTION OF THE         │
  │ DROPLETS FROM THE APERTURE BEFORE            │
  │ IMPACTING THE TARGET WITH THE PORTION        │
  └──────────────────────┬───────────────────────┘
                         ▼
                    ┌─────────┐
                    │   END   │
                    └─────────┘
```

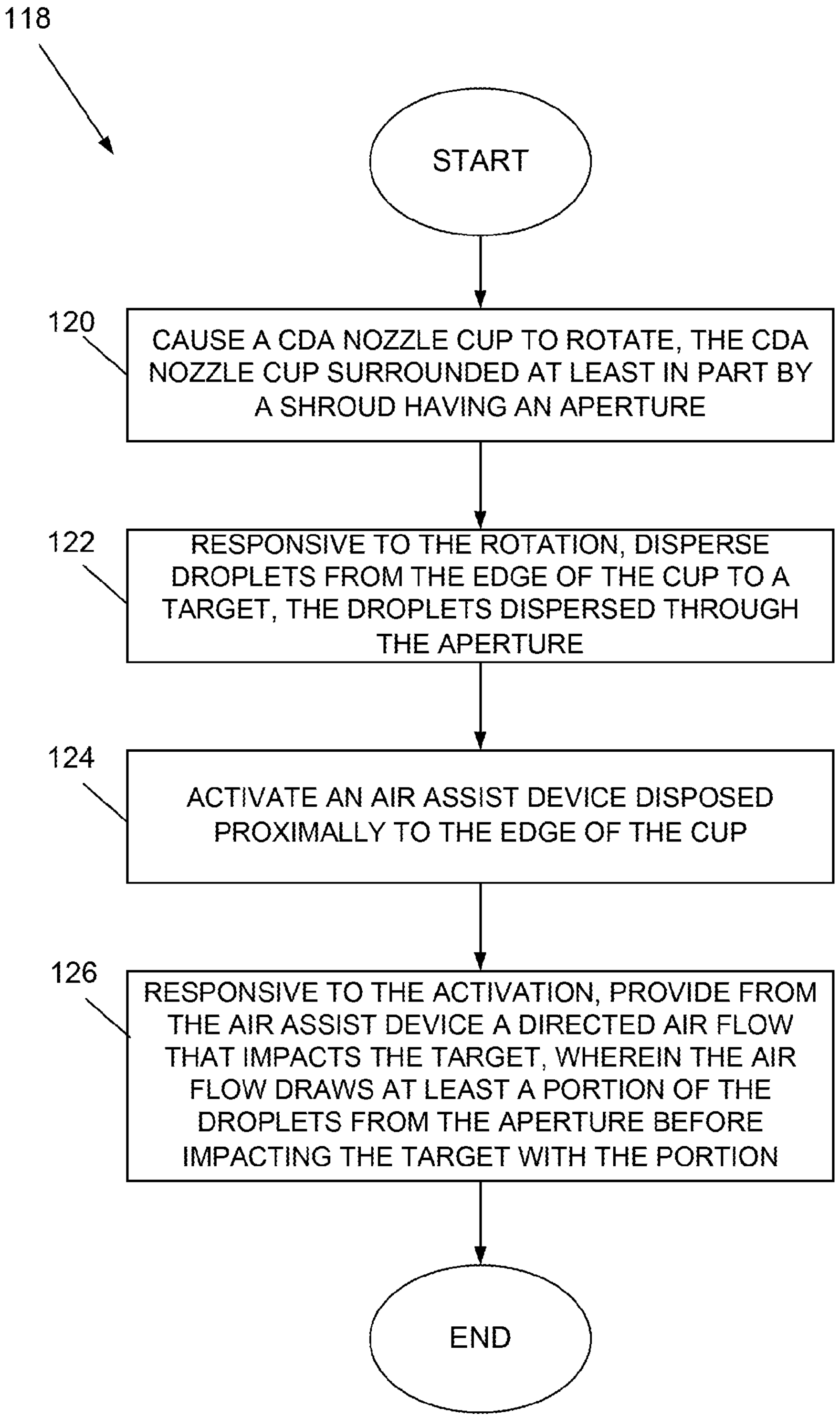

FIG. 6

AIR ASSISTANCE AND DRIFT REDUCTION TECHNOLOGY FOR CONTROLLED DROPLET APPLICATOR

CROSS REFERENCE TO RELATED APPLICATION

This application claims the benefit of U.S. Provisional Application No. 61/707,338, filed Sep. 28, 2012, which is hereby incorporated by reference in its entirety.

TECHNICAL FIELD

The present disclosure is generally related to spraying technology, and, more particularly, to controlled droplet applicators.

BACKGROUND

A controlled droplet applicator (CDA) nozzle operates on a completely different principle than conventional hydraulic nozzles. CDA nozzles deposit liquid fluid to be applied on the inside of a spinning cup. The inside of the cup may be lined with ridges traveling from the narrow end of the cup to the wide end. These ridges help impart rotational energy to the liquid fluid, spinning it faster. The ends of the ridges are used to shear the flowing liquid fluid into droplets. As the CDA cup spins faster, the smaller droplets get sheared and released from the end of the ridges, which enables the spectrum of droplet sizes to be controlled by adjusting the speed of the CDA cup. However, sometimes the force of the dispersed droplets is not enough to suitably impact the target to generate an appropriate effect (e.g., pest control).

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a flow diagram of an embodiment of an example CDA method.

DESCRIPTION OF EXAMPLE EMBODIMENTS

Overview

Figure 1:
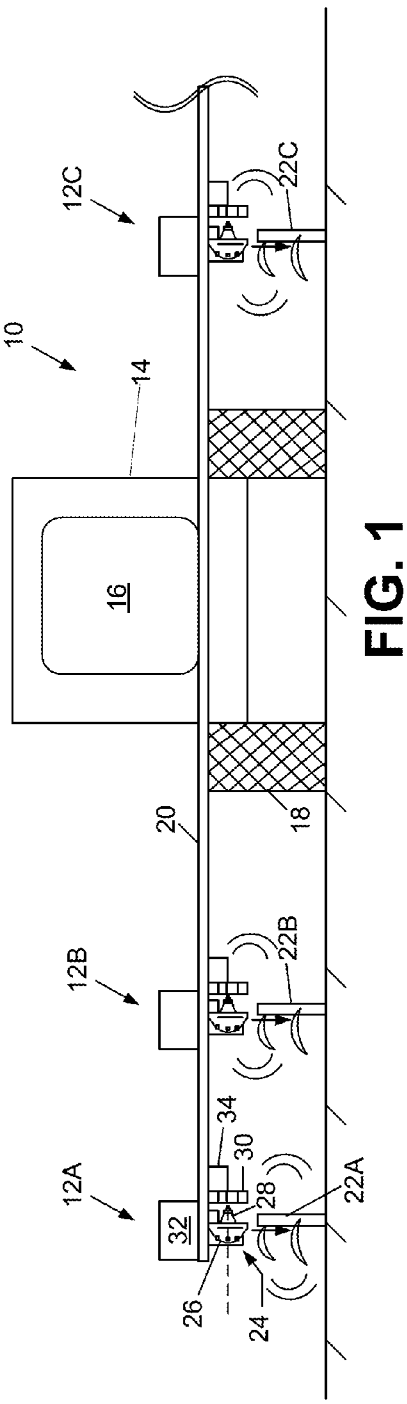
FIG. 1 is a schematic diagram that illustrates, in rear elevation view, an example environment in which certain embodiments of controlled droplet applicator (CDA) systems may be employed.

In one embodiment, a controlled droplet applicator (CDA) system comprising a CDA nozzle cup having an open end; a shroud covering all but a portion of the open end; and an air assist device disposed proximal to the open end, the cup and the air assist device separated by at least a portion of the shroud.

DETAILED DESCRIPTION

Certain embodiments of a controlled droplet applicator (CDA) system and method are disclosed that include a CDA nozzle and cooperating air assist device. In one embodiment, the CDA nozzle comprises a shroud that covers at least in part a lip of a CDA nozzle cup, where the shroud uses air flow from the air assist device and guide vanes to guide the air flow into the desired direction. The air flow from the air assist device draws the smaller droplets output from the lip of the cup into the air flow. For instance, the air assist device generates a low pressure region with a change in pressure between the internal shroud and the air outlet. The low pressure region is placed near the droplet release area of the cup (e.g., proximal to the lip), enabling the smaller droplets to be drawn into the air stream and/or reach the target. The air assist device of the CDA system causes the canopy of the target (e.g., foliage, pests on the foliage, etc.) to be opened up, enabling the liquid fluid (hereinafter, liquid fluid also referred to simply as fluid) droplets dispersed from the lip of the CDA nozzle cup to be suitably applied to the target. The air assist device also achieves drift reduction by ensuring smaller droplets are drawn back to the target.

The CDA system nozzles, like conventional CDA system designs, produce droplets of uniform size with a lower liquid fluid input than hydraulic nozzles. By producing droplets of uniform size, the volume of liquid fluid wasted in ineffective droplet size may be minimized. However, current CDA systems lack the ability to direct the spray pattern to anywhere but the vertical or near vertical orientation. For instance, conventional CDA nozzle cups are spun in a vertical or near vertical orientation (e.g., within ten (10) degrees of the vertical axis) to provide a circular pattern, possibly wasting fluid where the applicator of the spray is not needed. The CDA systems of the present disclosure may be oriented in any direction. Further, conventional CDA systems lack the fluid stream force when compared to the CDA systems of the present disclosure, which may result in less than adequate liquid fluid coverage when compared to the CDA systems of the disclosure.

Having summarized certain features of CDA systems of the present disclosure, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is a simplified schematic of a rear end of an agricultural machine embodied as a self-propelled sprayer machine 10, which provides an example environment in which one or a plurality of controlled droplet applicator (CDA) systems 12 (e.g., 12A, 12B, and 12C) may be employed. To provide perspective, the sprayer machine 10 is traveling away from the reader (e.g., heading into the page) as it advances. It should be appreciated within the context of the present disclosure that the example CDA systems 12 may be used on other agricultural machines or machines for other industries with similar or different configurations than those depicted in FIG. 1, including as part of a towed implement or affixed to other machines. Certain features of sprayer machines well known to those having ordinary skill in the art are omitted in FIG. 1 to avoid obfuscating pertinent features of CDA systems 12. The sprayer machine 10 comprises a cab 14 and a tank 16 that mounts on a chassis. The cab 14 comprises operational controls that an operator interfaces with to navigate and/or control functions on the sprayer machine 10. Note that some embodiments may utilize automated machines that need not have an operator residing in the cab 14, or in some embodiments, the sprayer machine 10 may be operated via remote control. The tank 16 stores liquid fluid for used in dispensing to targets located in a field traversed by the sprayer machine 10. The sprayer machine 10 further comprises wheels 18 to facilitate traversal of a given field, though some embodiments may utilize tracks. It should be appreciated that the axle arrangement depicted in FIG. 1 is merely illustrative, and that other arrangements are contemplated to be within the scope of the disclosure.

The sprayer machine 10 further comprises a boom 20 (only the bottom portion shown for brevity) branching out from both sides of the sprayer machine 10 and shown in truncated form on the right hand side of FIG. 1. The boom 20 comprises conduit(s) (e.g., metal, rubber, or plastic tubing, wiring, cable, etc.) for hydraulics, pneumatics, electronics, etc., as well as comprising different motive force devices such as pumps, motors, power sources, etc. to influence the flow of fluids and/or to control the operations and/or positioning of certain devices, such as the CDA systems 12.

The sprayer machine 10 navigates across the field to dispense fluid from the CDA systems 12 to various targets. The CDA systems 12 may spray fluids (e.g., chemicals) on crops, bare ground, pests, etc., as pre-emergence and/or post-emergence herbicides, fungicides, and insecticides. In this example, the targets comprise the leafy areas of crops 22 (e.g., 22A, 22B, 22C, etc.), such as for addressing pest infestation. In one embodiment, each CDA system 12, such as CDA system 12A (used an illustrative example hereinafter, with the understanding that each CDA system may have similar features), comprises a CDA nozzle 24 having a directional shroud 26 and a cup 28 encircled at least in part by the directional shroud 26. Although the cup 28 (and hence nozzle 24) is shown oriented in a horizontal orientation (e.g., rotatable around a horizontal axis of rotation as indicated by the dashed line through the cup 28), in some implementations, the cup 28 may be oriented in other orientations. The directional shroud 26 serves to block a portion of the circular fluid spray dispersed from the open end of the cup 28, enabling a directed fluid spray. The directional shroud 26 may be rotatably oriented to modify the direction of the fluid spray.

The CDA system 12A further comprises an air assist device 30, embodied as a fan, blower, etc. The air assist device 30 is disposed proximally to an open end (e.g., droplet discharge end) of the cup 28. The CDA system 12A further comprises one or more motive force devices, such as an actuator 32 for providing rotational power to the cup 28 to cause rotation, and an actuator 34 for providing power to the air assist device 30. In some embodiments, a single motive force device may provide power to both the nozzle 24 and the air assist device 30. The motive force devices 32 and 34 may operate according to hydraulic, pneumatic, and/or electric power. In some embodiments, the motive force devices 32 and 34 may comprise a self-contained power source (e.g., battery), and in some embodiments, the motive force devices 32 and 34 may rely on external power sources (e.g., generator, battery of the sprayer 10, external hydraulic motor, etc.).

In operation, as the sprayer machine 10 advances along the field, the air flow from the air assist device 30 pushes (denoted by the "arcs" on each side of the crop 22) the canopy of leaves of the crops 22 (e.g., to expose the underside of the crop leaf or leaves), and the directed spray fluid (denoted by the arrowhead) from the rotating cup 28 impacts the target (e.g., the underside (and other portions) of the crop leaves).

Figure 2:
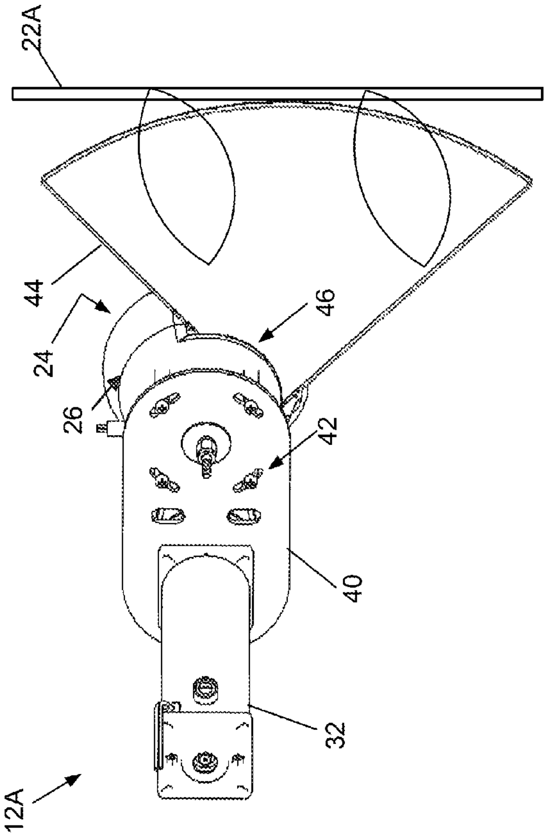
FIG. 2 is a schematic diagram that illustrates an example embodiment of a CDA system without the air assist device and how the CDA system impacts the target.

Referring now to FIG. 2, shown is an embodiment of the CDA system 12A with the air assist device 30 omitted to facilitate the explanation of the fluid spray features of the CDA system 12A. The CDA system 12A comprises the motive force device 32 (hereinafter referred to as actuator 32) coupled to a frame 40, the latter adjustably coupled to the boom 20 (FIG. 1). The frame 40 is also adjustably coupled to the nozzle 24 comprising the directional shroud 26. For instance, as shown in FIG. 2, plural slots 42 are disposed in the frame 40 through which bolts or other securing components may be loosened to enable the rotation of the directional shroud 26. A fluid spray 44 dispersed from an aperture 46 of the directional shroud 26 is in the form of a truncated spray (e.g., vertical arc) that targets the entire length of the crop 22A (although different arc lengths may be used in some embodiments), enabling precise and directed control of the fluid spray 44. In other words, the circular fluid spray dispersed from the cup 28 of the nozzle 24 is modified by a deflector portion of the directional shroud 26, with the undeflected fluid spray 44 dispersed through the aperture 46 to precisely and controllably reach the target.

Although the axes or rotation has been described in association with FIGS. 1-2 as horizontal, it should be appreciated that the orientation of the axis of the cup 28 may be adjusted according to a variety of different angles using different mechanisms (e.g., infinitely variable, or variable in stepped increments).

Figure 3A:
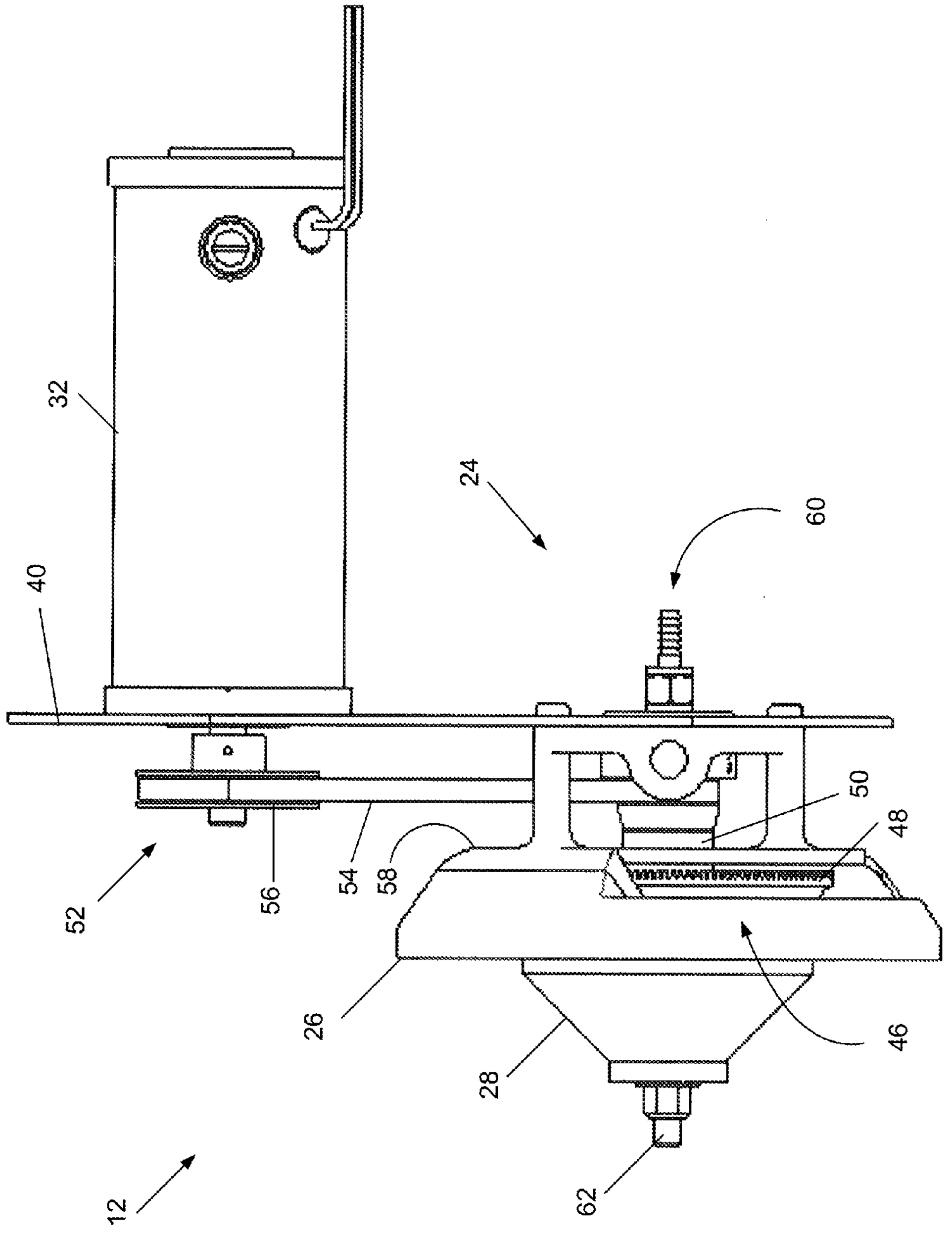
FIG. 3A is a schematic diagram that generally depicts an embodiment of an example CDA system without the air assist device, with the CDA nozzle in horizontal orientation and covered in part by a directional shroud.

Having described an example environment in which certain embodiments of CDA system adjustment have been described, attention is directed to FIGS. 3A-3D, which depict several illustrations of an embodiment of a CDA system 12, with each illustration focusing on select features of the system except with the air assist device 30 omitted for brevity. One having ordinary skill in the art should appreciate in the context of the present disclosure that the CDA system 12 shown in, and described in association with, FIGS. 3A-3D, is merely illustrative, and that other system arrangements with fewer or additional components are contemplated to be within the scope of the disclosure. As is evident by comparison among FIGS. 3A-3D, certain features are omitted in each figure to emphasize the features shown in a particular figure. Referring now to FIG. 3A, shown is an embodiment of an example CDA system 12, with the air assist device 30 and associated componentry omitted. As described above, the CDA system 12 may be secured to a tractor frame, boom, among other agricultural equipment similar to implementations for conventional CDA nozzles. The CDA system 12 exhibits some of the well-known characteristics of conventional CDA nozzles, including the provision of a substantially uniform size fluid droplet based on low flow inputs.

The CDA system 12 comprises the CDA nozzle 24 that is depicted in FIG. 3A in the horizontal orientation, though any orientation may be used. The CDA nozzle 24 comprises the cup 28 and the directional shroud 26 that covers at least a portion of the fluid-discharge end of the cup 28. For instance, in one embodiment, the cup 28 comprises a circumferential, outward-directed lip 48 from which the substantially uniform size fluid droplets are dispensed in a circular flow pattern. The directional shroud 26 blocks all but a portion of the dispensed fluid, such as a portion that passes the directional shroud 26 through the aperture 46 of the directional shroud. In one embodiment, the aperture 46 is defined by a single arc (or a plurality of arcs in some embodiments) located on the surface of the directional shroud 26. The CDA nozzle 24 also comprises a shaft 50 that runs longitudinally through a portion of the cup 28. Disposed concentrically within the shaft 50 is a hollow spindle that introduces fluid into the cup 28, as described further below. The shaft 50 is coupled to the cup 28 and is engaged by a drive system 52 to cause rotation of the cup 28. The cup 28 rotates to produce droplets from an inputted fluid stream. In one embodiment, the drive system 52 comprises the actuator 32 (e.g., rotational) and a pulley 54. The pulley 54 engages a wheel 56 of the actuator 32 and also engages the shaft 50 of the nozzle 24 to cause rotation of the cup 28. The drive system 52 and nozzle 24 are mounted to the frame 40, the nozzle 24 mounted to the frame 40 at least in part by a deflector portion 58 of the directional shroud 26. The directional shroud 26 comprises a mounting portion that secures the shroud 26 to the frame 40. An input end 60 extending beyond the frame 40 and a nut at the opposite end compress the frame 40, the pulley 54, shaft 50, and the cup 28 together. The shroud 26 is mounted independently onto the frame 40, as noted above, and around the rotating sub-assembly (e.g., pulley 54, shaft 50, and cup 28), and hence the rotating sub-assembly rotates approximately in the middle of the shroud 26. In some embodiments, the deflector portion 58 may be segregated into multiple components that are collectively assembled together. The frame 40 may be connected (e.g., in adjustable or in some embodiments, fixed manner) to the boom 20 (FIG. 1) of the sprayer machine 10, or other machines (e.g., a towed implement). In one embodiment, the frame 40 rigidly secures the aforementioned components with respect to each other.

Fluid is provided to the input 60 of the nozzle 24. The fluid may be provided through a flow control apparatus or system, as is known in the art. For instance, a flow control system may meter a defined volume of fluid into the input 60, the fluid then flowing through a spindle 62 for deposit into the interior of the cup 28.

In one example operation, the actuator 32 of the drive system 52 provides rotational motion to rotate the cup 28. In other words, the pulley 54 transfers the rotational motion of the actuator 32 to the shaft 50, which through coupling between the shaft 50 and the cup 28, causes the cup 28 to rotate. The shaft 50 rotates around a hollow, stationary spindle that is surrounded by the shaft 50, as explained below. In one embodiment, an even flow of fluid is injected by a flow control system into the input 60. The fluid flows through the hollow spindle 62 and is discharged via one or more openings in the spindle 62 into the interior space of the cup 28. In one embodiment, fins of a fin assembly located internal to the cup 28 divide and compartmentalize the fluid evenly inside the cup 28 and ensure that the cup 28 produces an even distribution of uniformly-sized droplets. In some embodiments, the fin assembly may be omitted.

It should be appreciated within the context of the present disclosure that variations of the aforementioned CDA system 12 are contemplated and considered to be within the scope of the disclosure. For instance, in some embodiments, the drive system 52 may include a belt, gears, chain, hydraulic motor, pneumatic motor, etc. In some embodiments, the depicted drive system 52 may be omitted in favor of drive system that includes a direct coupling between a motor and the cup 28. In some embodiments, additional structure and/or components may be included, such as a precise speed control of the cup 28, a fan to assist droplet travel and penetration (e.g., into foliage), among other structures. Although not limited to a specific performance, some example performance metrics of the CDA system 12 may include a minimum flow rate of approximately 0.05 gallons per minute (GPM), a maximum flow rate of approximately 0.3 GPM, a minimum cup speed of approximately 2500 RPM, and a maximum cup speed of approximately 5000 PRM. These metrics are merely illustrative, and some embodiments may have greater or lower values.

Figure 3B:
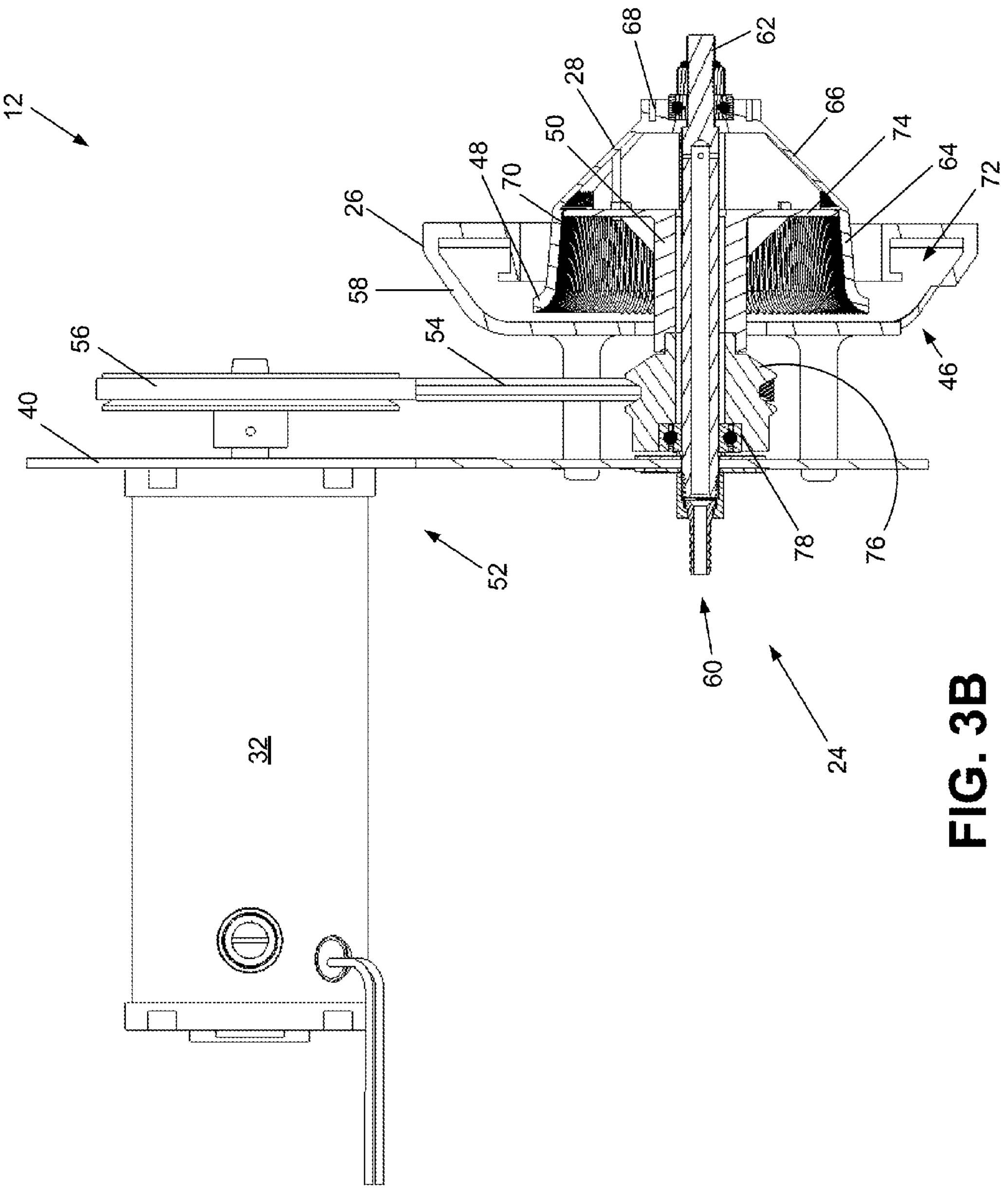
FIG. 3B is a schematic diagram showing select features in cut-away view of the example CDA system shown in FIG. 3A.

Attention is now directed to FIG. 3B, which provides a cutaway view of certain features of the CDA system 12 shown in FIG. 3A. Note that in some embodiments, the CDA system 12 may comprise the nozzle 24 and the drive system 52 coupled to the frame 40. In some embodiments, the CDA system 12 may comprise fewer or greater numbers of components. Recapping from the description above, the CDA system 12 comprises the CDA nozzle 24. The CDA nozzle 24 comprises the cup 28, the directional shroud 26, the shaft 50, and the spindle 62. In one embodiment, the cup 28 comprises a geometrical configuration that includes the circumferential lip 48 from which droplets are dispersed toward a target according to a circular spray pattern. In one embodiment, the lip 48 is directed outward from the central axis of the cup 28. In some embodiments, the lip 48 is not directed outward relative to the central axis of the cup 28. The cup 28 also comprises a wide portion 64 and a narrow portion 66 that includes a base 68. The narrow portion 66 includes a diameter that decreases from the wide portion 64 to the base 68. In some embodiments, within the cup 28 corresponding to an interior surface of the narrow portion 66 is a fin assembly, as described further below. The interior surface of the cup 28 corresponding to the lip 48 and the wide portion 64 (and partially the narrow portion 66) comprises a plurality of longitudinal ridges 70, each pair of ridges 70 defining grooves therebetween to channel the fluid as the cup 28 rotates to provide a circular flow pattern of droplets released at the lip 48. In other words, the uniform droplets are dispersed from grooves (the grooves formed by plural ridges 70 in the interior surface of the cup 28, the ridges breaking off the droplets as the fluid flows from the grooves) at the lip 48 in circular fashion. All but a portion of the dispersed fluid is blocked by the directional shroud 26. The unblocked fluid dispersed from the lip 48 passes the directional shroud 26 via the aperture 46 and hence is directed to a target, such as the ground or foliage (e.g., crops, weeds, pests, etc.). The blocked fluid is captured and routed by an internal channel 72 created by a reclamation portion of the directional shroud 26 and fed to a fluid reclamation system.

The nozzle 24 further comprises the shaft 50, which extends from one end of the cup 28 and is coupled to the interior surface of the cup 28. The shaft 50 surrounds (e.g., concentrically) at least a partial length of the hollow spindle 62. The hollow spindle 62 receives fluid (e.g., from a flow control system) from the input 60 and dispenses the fluid into the interior of the cup 28 corresponding to the narrow portion 66 (e.g., proximal to the base 68). The spindle 62 is coupled to an interior surface of the base 68 of the cup 28. Introduced in FIG. 3B is a circular cap 74 that segments the interior of the cup 28 in a plane proximal to the transition between the wide portion 64 and the narrow portion 66. In one embodiment, the cap 74 is integrated (e.g., molded, cast, etc.) with the shaft 50. In some embodiments, the cap 74 is coupled to the shaft 50 according to other known fastening mechanisms, such as via welding, riveting, screws, etc. In one embodiment, the cap 74 is also mounted to a fin assembly as described further below, although in some embodiments, the fin assembly may be omitted and the shaft 50 coupled to the cup 28 according to other fastening mechanisms. For purposes of brevity, the remainder of the disclosure contemplates the use of a fin assembly, with the understanding that the fin assembly may be omitted in some embodiments. The shaft 50 further comprises a hexagonal key portion 76 and bearing assembly 78 disposed between the frame 40 and the cup 28. The key portion 76 provides an area of engagement for the pulley 54 of the drive system 52, at the nozzle 24, the other area of engagement at the wheel 56 associated with the actuator 32 of the drive system 52. The bearing assembly 78 (along with a bearing assembly on an opposing end of the spindle 62, as described below) enables the spindle 62 to guide the rotation of the shaft 50 and cup 28 relative to the stationary spindle 62, as driven by the drive system 52.

Also depicted in FIG. 3B, the directional shroud 26 mounts to the frame 40 via the deflector portion 58. The input end 60 extending beyond the frame 40 and a nut at the opposite end of the spindle 62 compress the frame 40, the pulley 54, shaft 50, and the cup 28 together. The directional shroud 26 is mounted independently onto the frame 40, as noted above, and around the rotating sub-assembly (e.g., pulley 54, shaft 50, and cup 28), and hence the rotating sub-assembly rotates approximately in the middle of the directional shroud 26. In some embodiments, the deflector portion 58 may be detachable from, yet coupled to, the mounting portion that mounts to the frame 40. The directional shroud 26 may be adjusted (e.g., in height) to enable the cup 28 to disperse the fluid in a fully circular spray of fluid or positioned to enable a truncated spray pattern. For instance, the directional shroud 26 may be offset from the outlet (e.g., lip 48) of the cup 28 (e.g., lifted closer to the frame 40) to avoid interfering with the discharge of the fluid droplets and hence enable a fully circular spray pattern of uniform droplets from the lip 48. In some embodiments, the directional shroud 26 may be positioned to block all but a portion of the circular spray pattern of the dispersed fluid, enabling a truncated spray pattern (e.g., in the form of a single arc spray pattern or plural arc spray patterns). The positioning of the directional shroud 26 may be achieved through manual adjustment, or in some embodiments, automatically (e.g., as controlled by a stepper motor or driven gear assembly coupled to the frame 40).

Figure 3C:
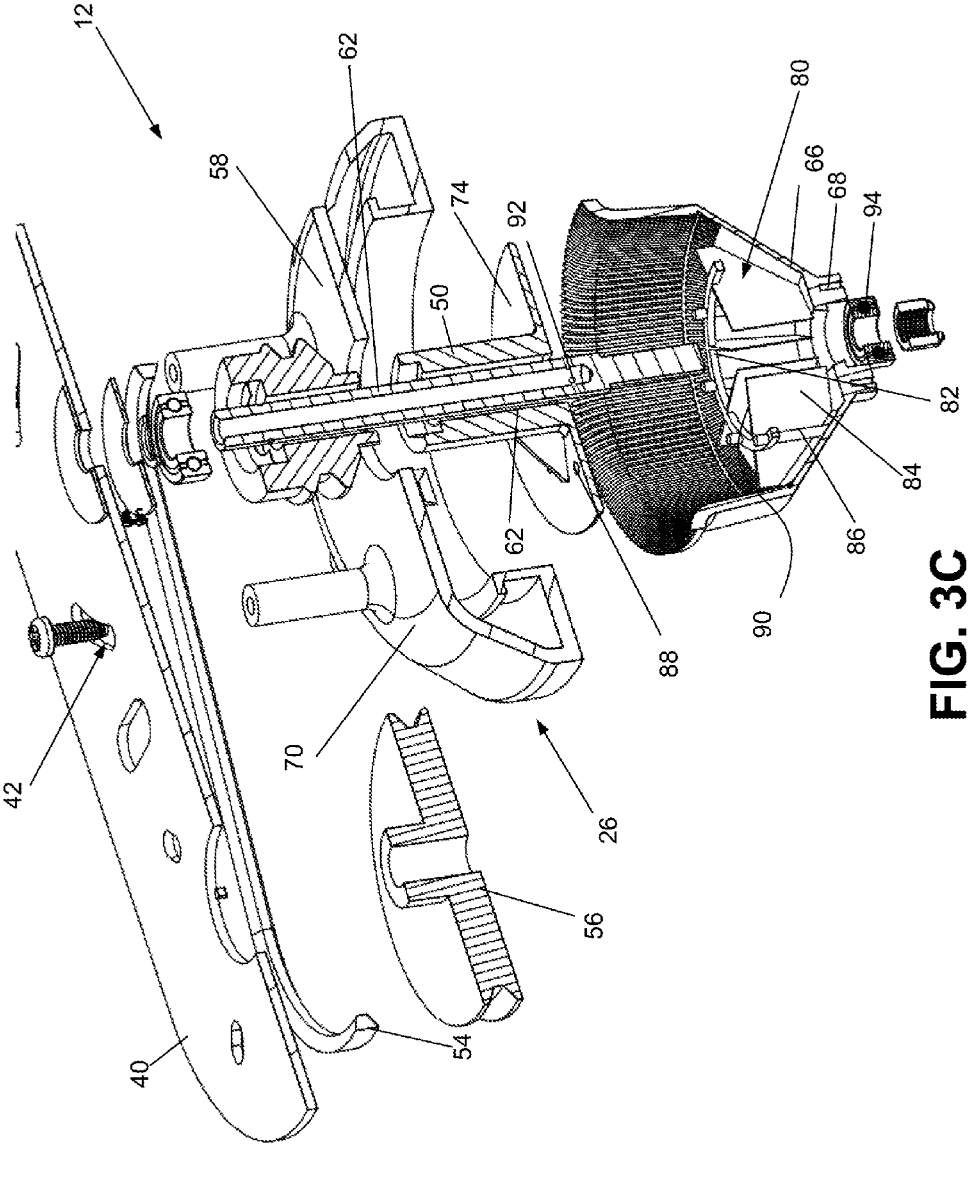
FIG. 3C is a schematic diagram showing certain features in exploded view of the example CDA system shown in FIG. 3A.

Referring to FIG. 3C, an exploded view of certain features of the CDA system 12 of FIGS. 3A-3B is shown. The frame 40 comprises the slots 42 to enable rotational adjustment of the deflector portion 58 of the directional shroud 26, as described above. The wheel 56, pulley 54, and shaft 50 have already been described in association with FIGS. 3A-3B, and hence further discussion of the same is omitted here for brevity except where noted below. Of particular focus for purposes FIG. 3C is a fin assembly 80, which includes a ring 82, a plurality of fins 84 coupled to or integrated with the ring 82, and a plurality of pins 86 disposed between each pair of fins 84. The fin assembly 80 depicted in FIG. 3C is one example configuration, and it should be appreciated that other configurations of the fin assembly (e.g., with a fewer or greater number of pins 86 or fins 84) are contemplated to be within the scope of the disclosure. The fin assembly 80 is connected to the interior surface of the cup 28 corresponding to the narrow portion 66, and in particular, connected via the pins 86. Further, the cap 74 of the shaft 50 mounts to the fin assembly 80 via the pins 86 and the cap holes 88 of the cap 74. The cap 74 rests on an edge 90 of each fin 84 of the fin assembly 80. Note that the shaft 50 and the cap 74 are depicted as an integrated assembly (e.g., molded or case piece), though in some embodiments, may be affixed to each other by known fastening mechanisms. Note that the spindle 62 comprises one or more holes 92 that release the fluid, inserted at the input 60 (FIG. 3B) and carried through the hollow spindle 62, to the interior of the cup 28. At the base 68 of the cup 28 is a bearing assembly 94.

Figure 3D:
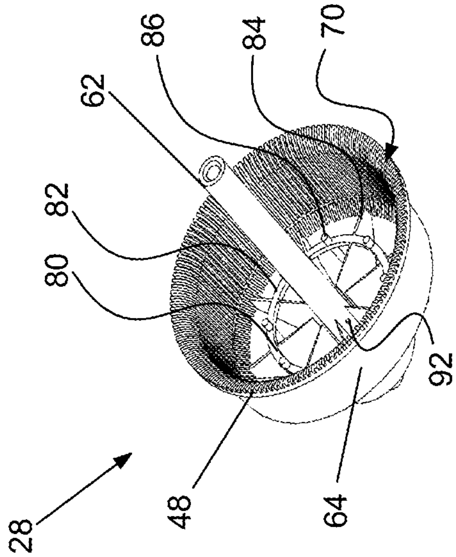
FIG. 3D is a schematic diagram of an embodiment of an example CDA nozzle cup in a perspective view showing a portion of an interior of the CDA nozzle cup.

Turning attention now to FIG. 3D, shown in perspective is a portion of the interior of one embodiment of the cup 28 (with some features omitted for purposes of discussion, such as the cap 74). It should be appreciated within the context of the present disclosure that variations in the depicted structure are contemplated for certain embodiments, such as fewer or additional fins, and/or the extension (or reduction) of the quantity of ridges 70 along a greater (or lesser) area of the interior surface of the cup 28. As depicted in FIG. 3D, the cup 28 comprises the hollow spindle 62. The spindle 62 comprises the openings 92 (one shown) proximal to the fin assembly 80, the holes 92 enabling the deposit of the fluid into the interior space of the cup 28. The cup 28 further comprises the longitudinal, discontiguous ridges 70 disposed on at least a portion of the interior surface (e.g., corresponding to the lip 48, wide portion 64, and a part (e.g., less than the entirety) of the narrow portion 66 (FIGS. 3A-3C). In some embodiments, the ridges 70 may occupy a larger amount of the interior surface, or a smaller part in some embodiments, or be contiguous throughout the interior surface of cup 28. Between the ridges 70 are grooves which enable the channeling of fluid injected from the spindle 62 to dispersion as droplets in a circular spray pattern beyond the lip 48.

The interior of the cup 28 further comprises the fin assembly 80, as described above in association with FIG. 3C. In one embodiment, the fin assembly 80 is disposed in an interior space adjacent the narrow portion 66 (e.g., the narrow portion 66 having a decreasing diameter from the wide portion 64 to the base 68 (FIGS. 3A-3C). As described above, the fin assembly 80 comprises the ring 82 that, in one embodiment, encircles a central or center region of the cup 28 occupied by the spindle 62. In one embodiment, a central axis of the ring 82 is coincident with a central axis of the spindle 62. The ring 82 is integrated with (e.g., casted or molded, or in some embodiments, affixed to) the plurality of the fins 84. The fins 84 extend from a location longitudinally adjacent the spindle 62 to the interior surface of the cup 28. In one embodiment, one or more edges of each fin 84 is flush (e.g., entirely, or a portion thereof) with the interior surface of the cup 28. In some embodiments, one or more edges of each fin 84 is connected (e.g., along the entire edge or a portion thereof in some embodiments) to the interior surface of the cup 28. In some embodiments, a small gap is disposed between one or more edges of each fin 84 (or a predetermined number less than all of the fins 84) and the interior surface closest to the fin 84. In some embodiments, the fins 84 may be affixed to the ring 82 by known fastening mechanisms (e.g., welds, adhesion, etc.) or integrations (e.g., molded, cast, etc.). The ring 82 further comprises the plural pins 86 that enable the mounting of the cap 74 (FIG. 3C) of the shaft 50 (FIG. 3A) to the fin assembly 80, which also enables the shaft 50 to cause the rotation of the cup 28. The pins 86 also secure the fin assembly 80 to the interior surface of the narrow portion 66.

Figure 4A:
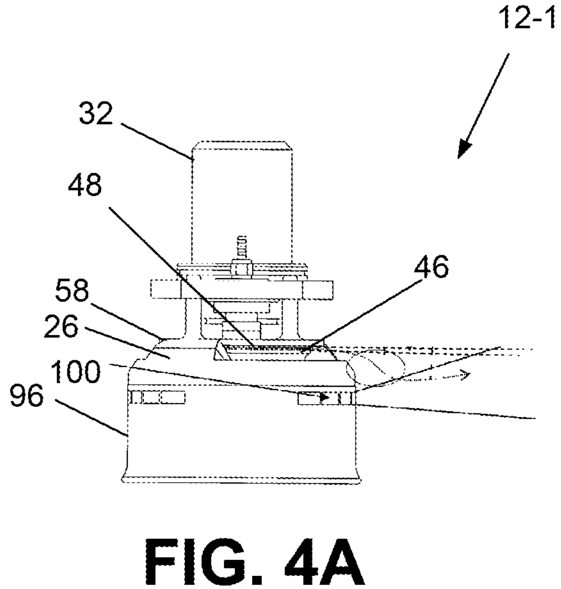
FIG. 4A is a schematic diagram of an embodiment of an example CDA system with an air assist device and CDA nozzle cup energized by the same motive force device.
Figure 4B:
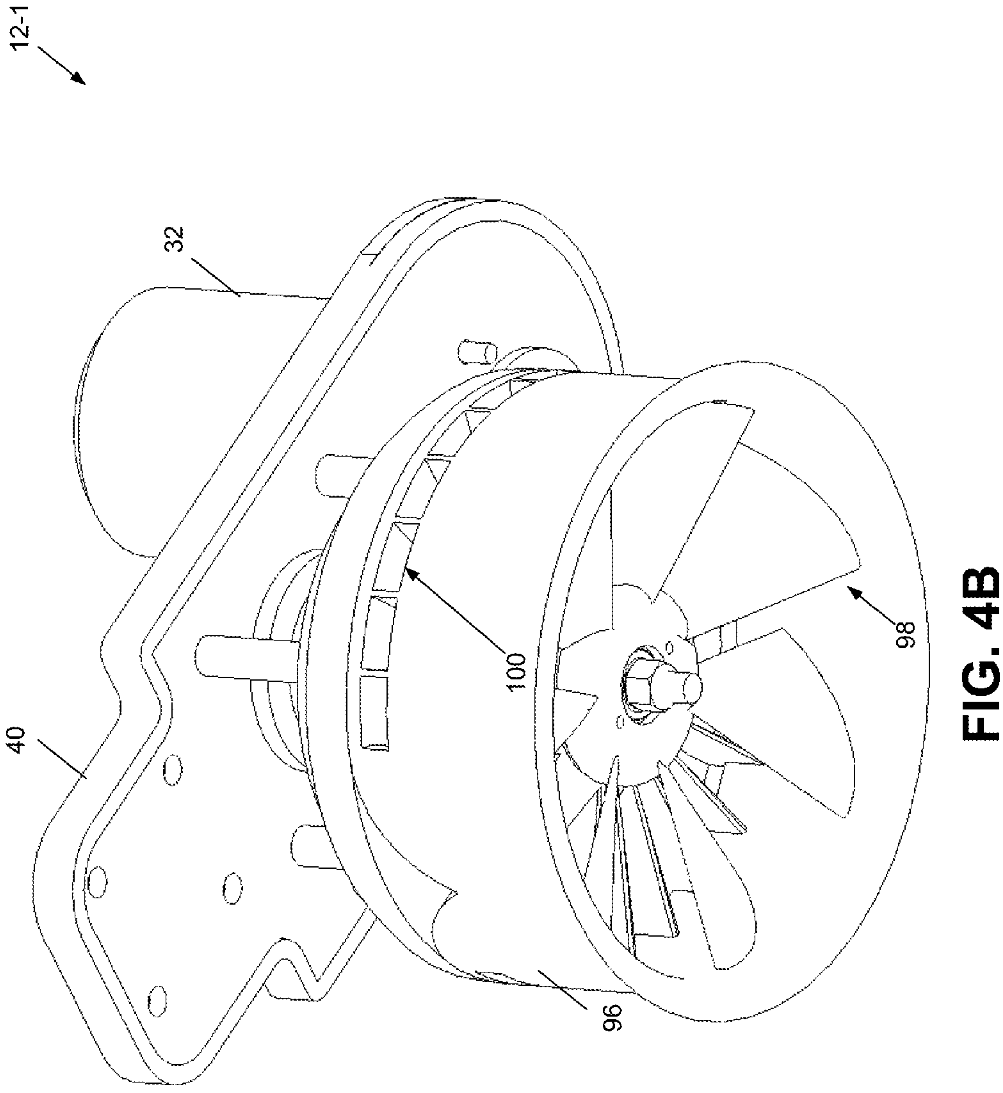
FIG. 4B is a schematic diagram showing a perspective view of the example CDA system depicted in FIG. 4A.

FIGS. 4A-4B are schematic diagrams that illustrate one embodiment of a CDA system 12, denoted CDA system 12-1. The CDA system 12-1 is shown in a vertical orientation (e.g., the cup rotates along a vertical axis in FIG. 4A), with the understanding that the CDA system 12-1 may be oriented differently in some embodiments. As depicted in FIG. 4A, the CDA system 12-1 comprises the deflector portion 58 of the directional shroud 26. The deflector portion 58 comprises one or more arc structures in the surface of the deflector portion 58 that deflect the circular fluid spray dispersed from the lip 48 of the cup 28 (FIG. 3A), with the undeflected fluid (denoted by the dashed line in FIG. 4A) passing the deflector portion 58 via the aperture 46 to be applied to a target. The reclamation portion of the directional shroud 26 is coupled to an air assist shroud (or simply, shroud) 96 that in one embodiment surrounds an air assist device 98, as shown in FIG. 4B. FIGS. 4A-4B reveal plural apertures, such as aperture 100, that enables the air flow generated by the air assist device 98 to pass the shroud 96, as denoted by the solid line passing through the aperture 100. In some embodiments, the directional shroud 26 and the shroud 96 may be an integrated assembly (single molded or cast piece). In some embodiments, the directional shroud 26 and the shroud 96 may each be modular components that are affixed to each other, such as welded, riveted, fitted, screwed, among other known fastening mechanisms. The air assist device 98 and the cup 28 are energized (e.g., rotated) together by the actuator 32 (e.g., via a common or coupled spindle/shaft assembly). In some embodiments, the air assist device 30 may be external to the shroud 96 and air flow from the air assist device 98 may be channeled into the inlet of the shroud 96 via a conduit.

In operation, the air assist device 98 generates an air flow that passes the apertures 100. A difference between the pressure between the outside and inside of the shroud 96 results in a Venturi effect, which draws the smaller droplets of the dispersed fluid spray that passes the aperture 46 into the air stream. The air stream and the dispersed fluid spray that passes the aperture 46 intersect at a location proximal to the target, which reduces the amount of drift (from any smaller droplets carried away by, for instance, the wind) and provides a more extensive application based on the pushing up of the canopy of the crop leaves.

Figure 5:
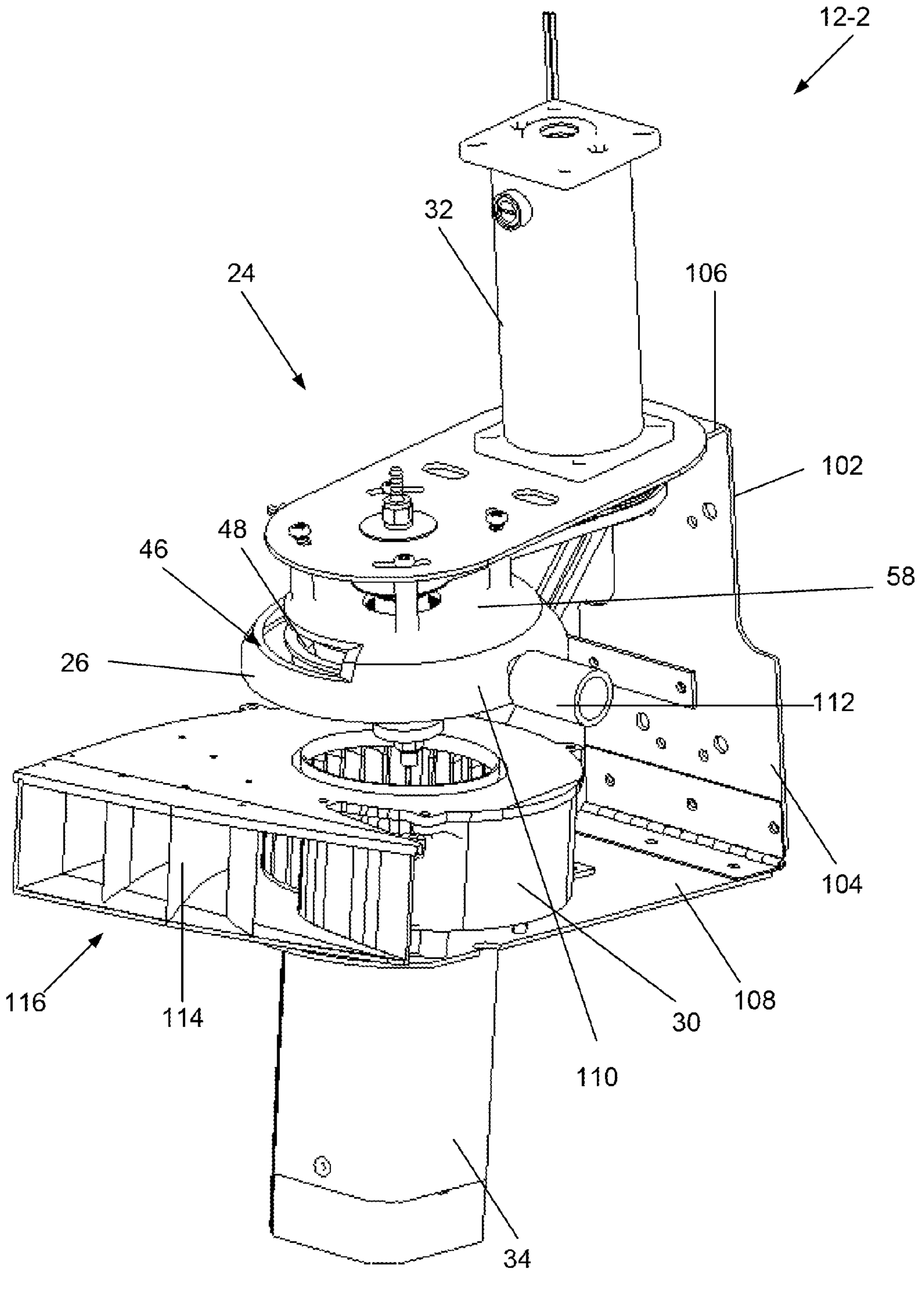
FIG. 5 is a schematic diagram of an embodiment of an example CDA system with an air assist device and a CDA nozzle cup energized by separate and independently operable motive force devices.

FIG. 5 provides another embodiment of the CDA system 12, denoted in FIG. 5 as CDA system 12-2. The CDA system 12-2 is shown in a somewhat vertical orientation (e.g., the cup rotates along an axis slightly offset from the vertical axis), with the understanding that the CDA system 12-2 may be oriented differently in some embodiments. The CDA system 12-2 is of a similar configuration to that shown in FIG. 1. The CDA system 12-2 comprises a multi-sided frame 102, with one side 104 for mounting to the boom 20 (or other structure) and another side 106 (e.g., the top side in FIG. 5, though not limited to that orientation) for securing the nozzle 24 and the actuator 32 associated with the nozzle 24. The frame 102 further comprises another side 108 that secures the air assist device 30 and the associated actuator 34. The side 108, in one embodiment, is angled in an acute angular manner relative to the adjacent side 104, to create an angle of less than 90 degrees between the two sides 108 and 104. In some embodiments, other degree angles may be created by the two sides 108 and 104.

The CDA system 12-2 comprises the deflector portion 58 of the directional shroud 26, with a reclamation portion 108 of the directional shroud 26 located beneath (in the orientation depicted in FIG. 5) the deflector portion 58. A reclamation portion 110 serves to collect the deflected portions of the circular fluid spray, where the collected fluid is routed via the channel 72 (FIG. 3B) to a drain port 112 to be returned (e.g., via assistance of a pump or educator) to a reservoir (e.g., the tank 16, or a reservoir proximal to the CDA system 12-2). The deflector portion 58 comprises arc-like structures on the surface of the deflector portion 58, enabling the circular fluid spray dispersed from the cup lip 48 to be blocked, while an arc-like spray pattern passes through the aperture 46 to impact the target. The cup 28 (FIG. 3A) of the CDA nozzle 24 is rotated by the actuator 32.

The air assist device 30 is proximal to, yet separated from, the nozzle 24 by a gap between the air assist device 30 and the bottom edge of the reclamation shroud 110. The air assist device 30 comprises a fan (not shown) and plural vanes 114 that are oriented to direct the air flow from a discharge end 116 of the air assist device 30. In some embodiments, the vanes 14 are adjustable (e.g., via a control signal or manually) to have suitable control of the air flow direction. The air assist device 30 is powered by the actuator 34. The power source of the actuators 32 and 34 may be co-located with each actuator 32 and 34, or separately sourced (e.g., via wiring, conduit, etc.). Further, the power source for each actuator 32 and 34 may be independent and/or of different values. For instance, the actuator 32 may be powered by a 24V supply, whereas the actuator 34 may be powered by a 120V supply. In some embodiments, the voltage levels to each actuator 32 and 34 may be the same, or in some embodiments, the source of power may be of different types. Though the power source is described of a type that is electrical in nature, in some embodiments, the power source may be hydraulic, pneumatic, solar, etc. As is evident from FIG. 5, the rotation of the cup 28 (FIG. 3A) of the nozzle 24 is independent of the rotation of the air assist device 30.

It is noted above that the side 108, in one embodiment, is angled in an acute angular manner relative to the adjacent side 104, to create an angle of less than 90 degrees between the two sides 108 and 104. For instance, since in this embodiment 12-2 the air assist device 30 is located farther from the fluid release point than the other embodiment 12-1, the air assist device 30 is tilted (via virtue of the tilt of the side 108) to allow the fluid plane (e.g., two-dimensional plane) into the air flow angular plane (e.g., three dimensional) depending on the distance between the crop 22 and the CDA nozzle 24.

Having described certain embodiments of a CDA system 12 (e.g., 12-1, 12-2, etc.), it should be appreciated within the context of the present disclosure that one embodiment of a CDA method (e.g., as implemented in one embodiment by the CDA system 12, though not limited to the specific structures shown in FIGS. 1-5), denoted as method 118 and illustrated in FIG. 6, comprises causing a CDA nozzle cup to rotate, the CDA nozzle cup surrounded at least in part by a shroud having an aperture (120); responsive to the rotation, dispersing droplets from the edge of the cup to a target, the droplets dispersed through the aperture (122); activating an air assist device disposed proximally to the edge of the cup (124); and responsive to the activation, providing from the air assist device a directed air flow that impacts the target, wherein the air flow draws at least a portion of the droplets from the aperture before impacting the target with the portion (126).

Any process descriptions or blocks in flow diagrams should be understood as merely illustrative of steps performed in a process implemented by a CDA system, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A controlled droplet applicator (CDA) system, comprising:

a rotating CDA nozzle cup having a circumferential lip defining an open end, wherein the cup is configured to disperse a circular fluid spray of droplet from the lip;

a stationary shroud covering all but a portion of the open end of the cup, the shroud having a first aperture circumferentially adjacent the portion of the open end through which a portion of the droplets dispersed from the lip forming the open end of the CDA nozzle cup may pass; and an air assist device disposed proximal to the open end, the air assist device surrounded by at least a-portion of the shroud, the shroud having a second aperture through which an air flow produced by the air assist device is directed, wherein the air flow directed through the second aperture draws at least a portion of the droplets dispersed through the first aperture into the air flow.

2. The CDA system of claim 1, further comprising a frame connected to the shroud.

3. The CDA system of claim 2, further comprising a motive force device connected to the frame, the motive force device configured to activate both the cup and the air assist device.

4. The CDA system of claim 1, wherein the air assist device comprises a fan.

5. The CDA system of claim 1, further comprising a shaft connected to the cup, a rotational actuator, and a pulley, the pulley operably coupled to the rotational actuator and the shaft.

6. The CDA system of claim 1, wherein a first portion of the shroud containing the first aperture is fastened to a second portion of the shroud containing the second aperture.

7. The CDA system of claim 1, wherein a first portion of the shroud containing the first aperture is formed integral with a second portion of the shroud containing the second aperture.

8. A controlled droplet applicator (CDA) method, comprising:

causing a CDA nozzle cup to rotate, the CDA nozzle cup surrounded at least in part by a stationary shroud having a first aperture, wherein the shroud surrounds an air assist device;

responsive to the rotation, dispersing droplets from a circumferential lip defining an open end of the cup, wherein a portion of the droplets are dispersed through the first aperture to a target;

activating an air assist device disposed proximally to the edge of the cup; and responsive to the activation, providing from the air assist device a directed air flow that impacts the target, wherein the air flow draws the portion of the droplets that pass through the first aperture toward the target, wherein the air flow is directed by the air assist device through a second aperture in the shroud.

9. The method of claim 8, wherein causing and activating are responsive to power provided by a single motive force device coupled to the nozzle and the air assist device.

10. The method of claim 9, wherein the power comprises electric power.

11. The method of claim 8, wherein the portion of the droplets comprise smaller droplets than the undrawn droplets.

* * * * *